US012105009B2

(12) United States Patent
Koshikawa et al.

(10) Patent No.: US 12,105,009 B2
(45) Date of Patent: Oct. 1, 2024

(54) METHOD FOR GENERATING DATA FOR PARTICLE ANALYSIS, PROGRAM FOR GENERATING DATA FOR PARTICLE ANALYSIS, AND DEVICE FOR GENERATING DATA FOR PARTICLE ANALYSIS

(71) Applicant: HORIBA, Ltd., Kyoto (JP)

(72) Inventors: Hiroyuki Koshikawa, Kyoto (JP); Hisashi Akiyama, Kyoto (JP); Tetsuya Mori, Kyoto (JP); Kosuke Matsuo, Kyoto (JP); Hitoshi Nakatani, Kyoto (JP); Toshihiro Katsuda, Kyoto (JP)

(73) Assignee: HORIBA, LTD., Kyoto (JP)

( * ) Notice: Subject to any disclaimer, the term of this patent is extended or adjusted under 35 U.S.C. 154(b) by 522 days.

(21) Appl. No.: 17/278,207

(22) PCT Filed: Jul. 5, 2019

(86) PCT No.: PCT/JP2019/026832
§ 371 (c)(1),
(2) Date: Mar. 19, 2021

(87) PCT Pub. No.: WO2020/066209
PCT Pub. Date: Apr. 2, 2020

(65) Prior Publication Data
US 2021/0349007 A1 Nov. 11, 2021

(30) Foreign Application Priority Data
Sep. 27, 2018 (JP) ................... 2018-182975

(51) Int. Cl.
*G01N 15/14* (2024.01)
*G01N 15/1433* (2024.01)
*G06N 20/00* (2019.01)

(52) U.S. Cl.
CPC .. *G01N 15/1433* (2024.01); *G01N 2015/1402* (2013.01); *G01N 2015/1493* (2013.01); *G01N 2015/1497* (2013.01); *G06N 20/00* (2019.01)

(58) Field of Classification Search
CPC ....... G01N 15/1463; G01N 2015/1402; G01N 2015/1465; G01N 2015/1493; G01N 2015/1497; G06N 20/00
See application file for complete search history.

(56) References Cited

U.S. PATENT DOCUMENTS

2005/0031188 A1 2/2005 Luu et al.
2017/0242234 A1* 8/2017 Ashcroft ................ G02B 21/24
(Continued)

FOREIGN PATENT DOCUMENTS

JP H03-131756 A 6/1991
JP H06-82454 A 3/1994
(Continued)

OTHER PUBLICATIONS

EPO, Extended European Search Report for the corresponding European application No. 19864804.0, dated May 13, 2022.
(Continued)

*Primary Examiner* — Jamil Ahmed
(74) *Attorney, Agent, or Firm* — LUCAS & MERCANTI, LLP

(57) ABSTRACT

In relation to application of artificial intelligence to image analysis of particles, to make it possible to provide data for machine learning corresponding to user demands while making it possible to reduce, as much as possible, man-hours taken to, for example, prepare vast amounts of actual image data obtained by actually capturing images of particles, the present invention generates virtual particle image data, which is image data of a virtual particle, on the basis of a predetermined condition, generates label data corre- (Continued)

sponding to the virtual particle, and associates the virtual particle image data with the label data.

15 Claims, 9 Drawing Sheets

(56) References Cited

U.S. PATENT DOCUMENTS

| | | | |
|---|---|---|---|
| 2017/0357844 A1* | 12/2017 | Comaniciu | G16H 30/00 |
| 2018/0253640 A1 | 9/2018 | Goudarzi et al. | |
| 2018/0322660 A1* | 11/2018 | Smith | G06T 7/97 |
| 2020/0202175 A1 | 6/2020 | Hieida et al. | |

FOREIGN PATENT DOCUMENTS

| | | |
|---|---|---|
| JP | H08-29317 A | 2/1996 |
| JP | 2004-505233 A | 2/2004 |
| JP | 2007-017282 A | 1/2007 |
| JP | 2010-151523 A | 7/2010 |
| JP | 2016-071597 A | 5/2016 |
| JP | 2017-102755 A | 6/2017 |
| JP | 2018-173328 A | 11/2018 |
| WO | 2001/082216 A1 | 11/2001 |
| WO | 2017/143332 A1 | 8/2017 |
| WO | 2018/020954 A | 2/2018 |
| WO | 2018/078613 A1 | 5/2018 |

OTHER PUBLICATIONS

Jay M. Newby, et al., "Convolutional neural networks automate detection for tracking of submicron scale particles in 2D and 3D," arxiv.org, Cornell University Library, 201 Olin Library Cornell University, Ithaca, NY 14853, Apr. 10, 2017.

PCT, International Search Report for the corresponding application No. PCT/JP2019/026832, dated Oct. 1, 2019, with English translation.

Japanese Patent Office, Decision to Grant a Patent dated Dec. 28, 2023 issued in JP patent application No. 2023-079318 and its English translation (5 pages).

Trial and Appeal Decision, dated Jul. 30, 2024, for the corresponding Japanese Patent Application No. 2020-548018, with English Translation.

* cited by examiner

METHOD FOR GENERATING DATA FOR PARTICLE ANALYSIS, PROGRAM FOR GENERATING DATA FOR PARTICLE ANALYSIS, AND DEVICE FOR GENERATING DATA FOR PARTICLE ANALYSIS

CROSS REFERENCE TO RELATED APPLICATION

This Application is a 371 of PCT/JP2019/026832 filed on Jul. 5, 2019, which, in turn, claimed the priority of Japanese Patent Application No. 2018-182975 filed on Sep. 27, 2018, both applications are incorporated herein by reference.

TECHNICAL FIELD

The present invention relates to, for example, a method for generating data to be used in image analysis of particles.

BACKGROUND ART

Hitherto, as a particle analyzer, as described in PTL 1, an analyzer is known that captures images of a sample moving in a flow cell using, for example, a video camera and analyzes particles in the images, which are still images, by performing image processing on the images.

Analysis algorithms for such an analyzer vary depending on user demands regarding analysis. Analysis algorithms corresponding to respective wide-ranging demands need to be generated, the wide-ranging demands corresponding to, for example, "the proportion of particles larger or smaller than a predetermined particle diameter and included in a group of particles", "the aspect ratio of a rectangular particle", and "the degree of aggregation of a group of particles".

When studying use of artificial intelligence based machine learning to generate such various analysis algorithms, the inventors of the present application thought that it was possible to generate algorithms corresponding to user demands through machine learning performed using, as training data, data obtained by for example performing labeling in which user evaluations of groups of particles (for example, as to whether a predetermined condition is satisfied or not) are associated with image data obtained by capturing images of the groups of particles.

However, in order to do that, it is necessary to prepare vast amounts of image data obtained by capturing images of particles, and even if vast numbers of pieces of image data can be prepared, huge numbers of man-hours are required to perform labeling in which user evaluations are associated with these respective pieces of image data.

CITATION LIST

Patent Literature

PTL 1: Japanese Unexamined Patent Application Publication No. 2010-151523

SUMMARY OF INVENTION

Technical Problem

Thus, a main objective of the present invention is to make it possible to generate analysis algorithms corresponding to user demands through machine learning while reducing, as much as possible, man-hours taken to, for example, prepare vast amounts of image data obtained by capturing images of actual particles.

Solution to Problem

That is, a method for generating data for particle analysis according to the present invention is a method that generates data for particle analysis to be used in image analysis of a particle, the method being characterized by including a virtual particle generation step of generating virtual particle image data, which is image data of a virtual particle, on a basis of a predetermined condition, a label generation step of generating label data corresponding to the virtual particle, and an association step of associating the virtual particle image data with the label data.

With this method for generating data for particle analysis, since the virtual particle image data, which is the image data of the virtual particle, is generated and the virtual particle image data is associated with the label data, man-hours taken to, for example, prepare vast amounts of image data obtained by capturing images of actual particles can be reduced as much as possible. Moreover, an analysis algorithm corresponding to user demands can be generated by inputting, as training data, a pair of the virtual particle image data and the label data to an artificial intelligence.

In order to make it possible to generate analysis algorithms corresponding to various demands, it is preferable that the method for generating data for particle analysis further include a machine learning step of performing machine learning using a plurality of pairs of the virtual particle image data and the label data associated with the virtual particle image data.

It is preferable that the predetermined condition include at least one out of a particle parameter representing an exterior of a particle and an optical parameter based on an image capturing condition for an image of a particle.

By using these parameters, various types of virtual particle image data can be generated.

It is preferable that the predetermined condition include a range of values of the particle parameter or that of the optical parameter, and a plurality of pieces of the virtual particle image data be generated in the virtual particle generation step on a basis of a plurality of values included in the range.

With this method, virtual particle image data of various virtual particles can be generated, the various virtual particles being obtained by, for example, changing in stages the exterior of a particle or the way in which the particle is present in an image.

As an embodiment for generating label data corresponding to demands on a user basis, it is preferable that content of the label data be one or more parameter values selected from the predetermined condition or a result obtained by comparing the selected one or more parameter values with a reference value.

It is preferable that the virtual particle image data include a plurality of particles for which values of the particle parameter or values of the optical parameter are different from each other.

By using the virtual particle image data, even an analysis algorithm for analyzing a group of particles can be generated through machine learning.

In order to make a virtual particle be more like an actual particle, it is preferable that the method for generating data for particle analysis further include a model particle acquisition step of acquiring information on a model particle, which is a model for the virtual particle, and the virtual particle image data be generated, in the virtual particle generation step, using the information on the model particle.

Moreover, a program for generating data for particle analysis according to the present invention is a program that generates data for particle analysis to be used in image analysis of a particle, the program causing a computer to execute functions as a virtual particle generation unit that generates virtual particle image data, which is image data of a virtual particle, on a basis of a predetermined condition, a label generation unit that generates label data corresponding to the virtual particle, and an association unit that associates the virtual particle image data with the label data.

Furthermore, a device for generating data for particle analysis according to the present invention is a device that generates data for particle analysis to be used in image analysis of a particle, the device being characterized by including a virtual particle generation unit that generates virtual particle image data, which is image data of a virtual particle, on a basis of a predetermined condition, a label generation unit that generates label data corresponding to the virtual particle, and an association unit that associates the virtual particle image data with the label data.

With this program for generating data for particle analysis or this device for generating data for particle analysis, substantially the same operational effects as those for the above-described method for generating data for particle analysis can be obtained.

Advantageous Effects of Invention

According to the present invention described above, while reducing, as much as possible, man-hours taken to, for example, prepare vast amounts of actual image data obtained by capturing images of actual particles, an algorithm corresponding to user demands can be generated through learning performed outside the device and based on artificial intelligence.

DESCRIPTION OF EMBODIMENTS

In the following, an embodiment of the present invention will be described with reference to the drawings.

Figure 1:
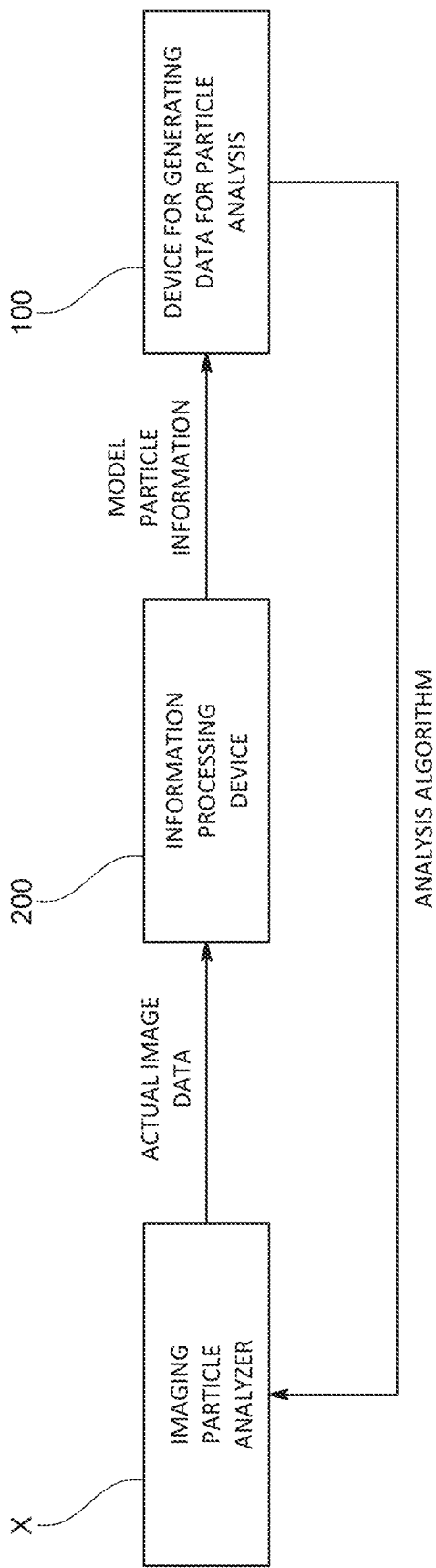
FIG. 1 is a schematic diagram illustrating a usage pattern of a device for generating data for particle analysis according to a present embodiment.

As illustrated in FIG. 1, a device 100 for generating data for particle analysis according to the present embodiment is used together with an imaging particle analyzer X, which analyzes particles included in a group of particles by using an image analysis method, and generates an analysis algorithm to be used by this imaging particle analyzer X.

An example of the imaging particle analyzer X may be an analyzer that includes a cell for containing a group of particles, a light irradiation device that irradiates the cell with light, an imaging device that captures an image of the group of particles contained in the cell, and an image analyzer that performs, for example, image processing on image data obtained by the imaging device to perform analysis; however, analyzers having various other configurations may also be used.

The device 100 for generating data for particle analysis uses input model particle information to generate training data that enables an artificial intelligence to perform machine learning, and generates an analysis algorithm through the machine learning as illustrated in FIG. 1. Before this device 100 for generating data for particle analysis is described in detail, first, model particle information to be input and an information processing device 200, which generates model particle information, will be described.

Figure 2:
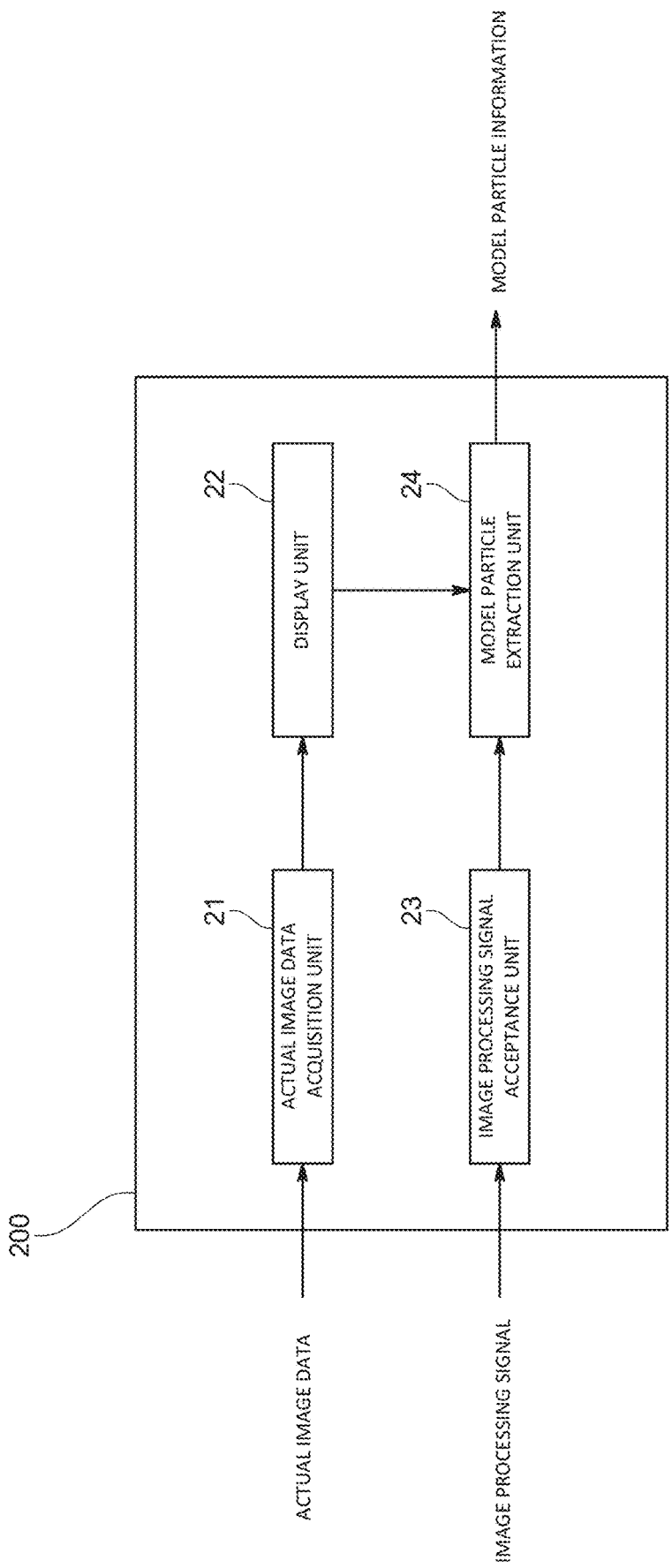
FIG. 2 is a functional block diagram for describing functions of an information processing device of the embodiment.

The information processing device 200 is a general-purpose or dedicated computer having a central processing unit (CPU), a memory, a display, and an input means such as a keyboard or a mouse, and executes functions as, for example, an actual image data acquisition unit 21, a display unit 22, an image processing signal acceptance unit 23, and a model particle extraction unit 24 on the basis of a program stored in the memory as illustrated in FIG. 2.

In the following, description of the operation of the information processing device 200 will be made, in which the individual units are described.

First, the actual image data acquisition unit 21 acquires actual image data in a wired manner, in a wireless manner, or via a recording medium such as a USB memory, the actual image data being obtained by the imaging device of the imaging particle analyzer X described above, and the display unit 22 displays an actual image represented by the actual image data on a display or the like.

Figure 3:
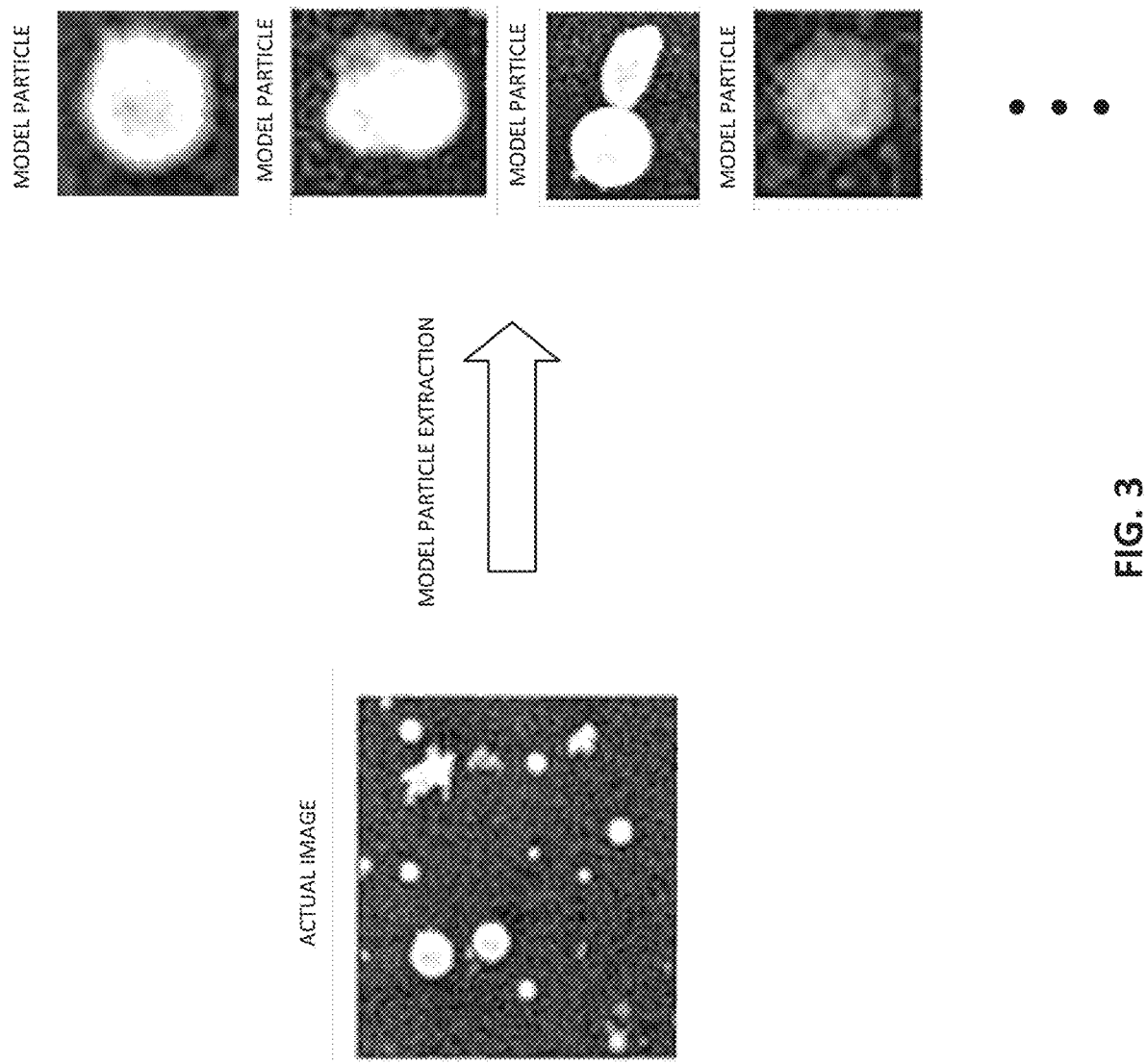
FIG. 3 is a diagram for describing a method for extracting model particle information using the information processing device of the embodiment.

Next, as illustrated in FIG. 3, model particles are selected from among a group of particles present in an actual image (white portions in the actual image), and model particle information, which is information on the model particles, is extracted. The model particles are models for virtual particles that will be described later (hereinafter referred to as virtual particles), which are a base for generating the virtual particles. The model particle information described here is information regarding images of the model particles, and is information that can be extracted by performing image processing or the like on the actual image data. Note that the model particles may be single particles formed by a unit particle or may be aggregated particles formed by aggregating a plurality of particles.

More specifically, for example, while checking an actual image displayed on a display or the like, an operator, such as an engineer, selects for example particles such as a clearly displayed particle, a particle oriented such that the shape of the particle can be recognized, and a particle having a desired size as model particles, and inputs using an input means such as a mouse or a touch panel an image processing signal for extracting, for example, the textures or edge lines of the model particles as model particle information from actual image data.

The input image processing signal is accepted by the image processing signal acceptance unit 23 of the information processing device 200 as illustrated in FIG. 2, and the model particle extraction unit 24 extracts from the actual image data at least the textures or edge lines of the model particles as model particle information on the basis of the image processing signal.

Here, the model particle extraction unit 24 may further extract as model particle information, for example, the sizes, shapes, colors, contrasts, and brightnesses of the model particles that can be extracted from the actual image data.

The model particle information extracted in this manner is output to the device 100 for generating data for particle analysis. Note that in order to generate various types of virtual image data, which will be described later, it is preferable that a plurality of model particles be selected from actual image data, and model particle information on these model particles be output to the device 100 for generating data for particle analysis; however, a single model particle may be selected, and only model particle information on the model particle may be output.

Next, the device 100 for generating data for particle analysis will be described.

Figure 4:
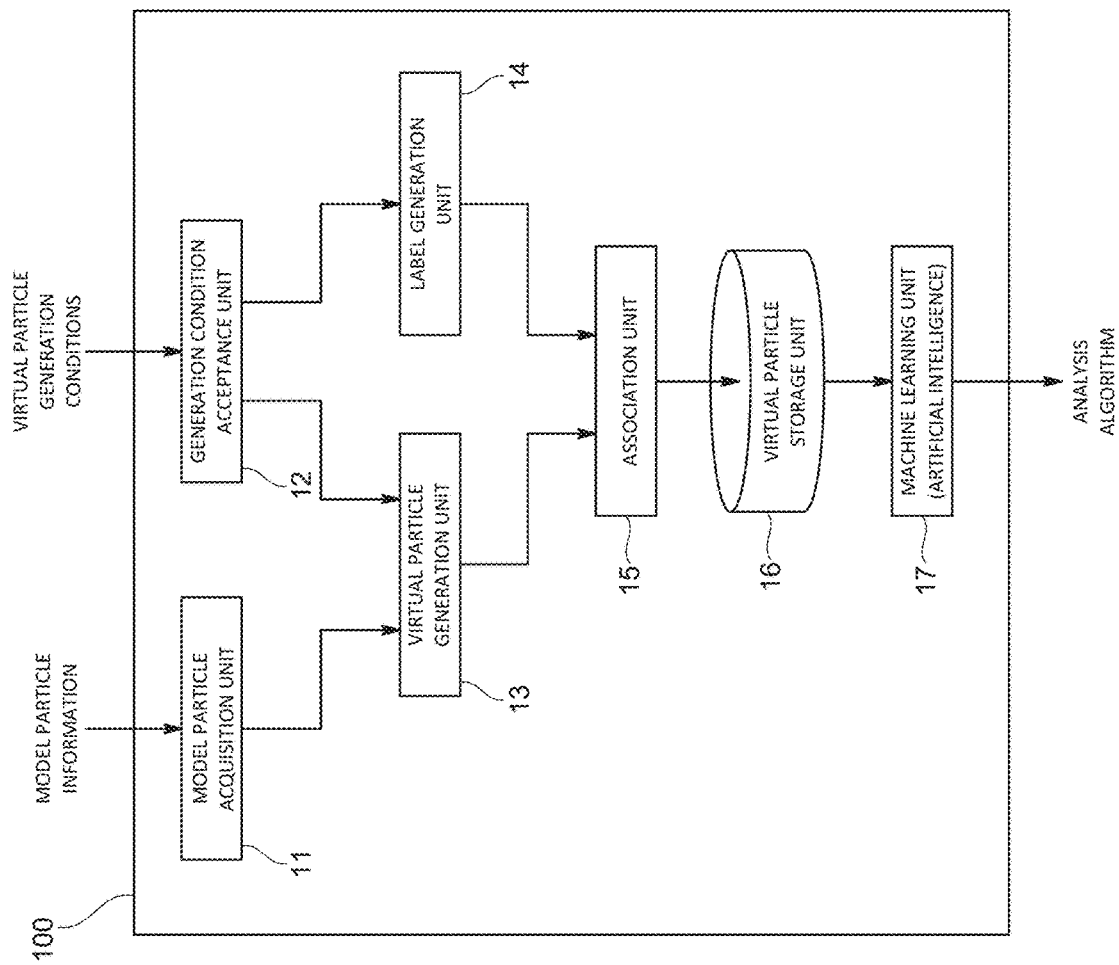
FIG. 4 is a functional block diagram for describing functions of the device for generating data for particle analysis of the embodiment.

The device 100 for generating data for particle analysis is a general-purpose or dedicated computer having, for example, a CPU, a memory, an analog-to-digital (AD) converter, and an input means such as a keyboard or a mouse. The device 100 for generating data for particle analysis executes functions as, for example, a model particle acquisition unit 11, a generation condition acceptance unit 12, a virtual particle generation unit 13, a label generation unit 14, an association unit 15, a virtual particle storage unit 16, and a machine learning unit 17 on the basis of a program stored in the memory as illustrated in FIG. 4.

In the following, description of the operation of the device 100 for generating data for particle analysis will be made, in which the individual units are described.

First, when model particle information is output from the information processing device 200 described above, the model particle acquisition unit 11 acquires this model particle information and transmits the model particle information to the virtual particle generation unit 13, which will be described later.

Here, the form of a model particle, that is, the way in which the model particle is present in an actual image changes in accordance with, for example, particle parameters of the model particle itself such as the size, shape, and orientation of the model particle. Furthermore, the form of the model particle also changes in accordance with the position where the model particle is present in an imaging field under device conditions such as, for example, an imaging method, the settings for the imaging device, and the type of light source of an imaging analyzer.

Thus, the device 100 for generating data for particle analysis according to the present embodiment is configured to be capable of receiving, as a condition for generating virtual particles, at least the particle parameters or the device conditions described above. Here, as illustrated in FIG. 4, the generation condition acceptance unit 12 accepts, as a virtual particle generation condition, the particle parameters and device conditions that have been input in advance.

With this configuration, when the operator, such as an engineer, inputs various particle parameters and various device conditions using the input means, the input virtual particle generation condition is transmitted from the generation condition acceptance unit 12 to the virtual particle generation unit 13. In relation to inputting, numerical ranges for changing a virtual particle into various forms in accordance with the content of the particle parameters and device conditions may be input in advance. Furthermore, the frequency (weight) of each numerical value in the numerical ranges may be input.

Specifically, the particle parameters include a particle shape parameter for changing the exterior, that is, at least one out of the texture and edge line of a model particle, and a particle distribution parameter for changing an aggregation state or a spatial distribution of particles. Examples of the particle shape parameter include a shape model, a shape parameter, and a surface state, which will be described in the following. Examples of the particle distribution parameter include a level of aggregation and a particle distribution.

<Shape Model>

A parameter representing the type of shape such as a polygonal column, a polyhedron, a polygonal pyramid, a sphere, an ellipsoid, a circular cylinder, a circular cone, or an indefinite shape (for example, a shape freely created by the operator).

<Shape Parameter>

A parameter representing the degree or size of deformation that does not change the type of shape such as the degree of roundness, degree of roughness, particle diameter, aspect ratio, and orientation (rotation angle) of a particle.

<Surface State>

A parameter regarding optical properties due to the surface state of a particle such as the transmissivity and reflectivity of the particle.

<Level of Aggregation>

A parameter representing the probability of another particle adhering to one particle and a maximum number of other particles that can be adhered to one particle.

<Particle Distribution>

A parameter representing the spatial distribution state of particles such as the density, number of, and arrangement of particles.

The device conditions are selected for, set in, and used for the imaging particle analyzer X on a user basis. Examples of the device conditions include an imaging method, camera settings, an acceleration voltage, optical conditions, the arrangement range of particles, and the number of pixels or the size of pixels in the following. These do not affect particles themselves but affect the way the particles are seen (present) in an imaging field. In particular, the optical conditions affect the difference in the way in which a particle is seen in accordance with the position of the particle in the imaging field. A focus position and a spatial resolution are related to the degree of blur of an image of a particle, aberration is related to the deformation or discoloration of a particle, and an illumination state is related to the contrast or brightness of an image of a particle. The degree of blur, deformation, discoloration, contrast, and brightness described above may be included in a virtual particle generation condition as parameters (optical parameters) for generating virtual particles.

<Imaging Method>

Conditions regarding an imaging method such as an optical method (a method using, for example, epi-illumination, transillumination, or ambient illumination), an electronic method (a method using, for example, secondary electrons, reflected electrons, transmission, absorption, or X-rays), atomic force microscopy (AFM), or fluorescence X-rays.

<Camera Settings>

Conditions regarding a color mode such as color, monochrome, or gray scale.

<Acceleration Voltage>

Conditions regarding a tube voltage in a case where an electron microscope or fluorescence X-rays are used.

<Optical Conditions>

Conditions regarding an optical system such as the spatial resolution, depth of focus, aberration (chromatic aberration, spherical aberration, coma aberration, astigmatic aberration, curvature of field, distortion aberration, or the like), and illumination conditions of an imaging device that captures images of particles.

<Arrangement Range of Particles>

Conditions regarding a range where particles can be present in a depth direction from the imaging device.

<Number of Pixels, Size of Pixels>

Conditions regarding the number of pixels or the size of pixels of a captured actual image.

The virtual particle generation unit 13 generates virtual particle image data, which is an image of a virtual particle, on the basis of the virtual particle generation condition accepted by the generation condition acceptance unit 12. Here, a virtual particle is virtually generated by changing the form of a model particle on the basis of the virtual particle generation condition, and image data of this virtual particle is generated as virtual particle image data.

The virtual particle generation unit 13 in this case generates, as a virtual particle, a single particle by performing, for example, image processing on a texture or an edge line included in the model particle information on the basis of one or more out of the particle parameters and device conditions, which are the virtual particle generation condition, and generates virtual particle image data representing the form of the virtual particle.

As a specific example, for example, when the generation condition acceptance unit 12 accepts, within predetermined numerical ranges, an aspect ratio, a particle diameter parameter such as a particle diameter, or an optical parameter such as the degree of blur, the virtual particle generation unit 13 generates virtual particle image data of various virtual particles obtained by changing the above-described parameters of model particles within the predetermined numerical ranges.

The label generation unit 14 generates label data for a virtual particle, and is configured to generate label data on the basis of the virtual particle generation condition in this case. This label data is, for example, data regarded as a true answer for virtual particle image data in machine learning, which will be described later, and indicates physical property values of the virtual particle, user evaluation of the virtual particle, or analysis results in a case where the virtual particle is analyzed.

Note that this label generation unit 14 may be configured to edit label data on the basis of an edit signal input by the operator, such as an engineer, using the input means.

Examples of the label data include data indicating analysis results obtained in a case where image analysis is performed on the virtual particle. For example, one or more parameter values selected in advance from the virtual particle generation condition are included.

Figure 5:
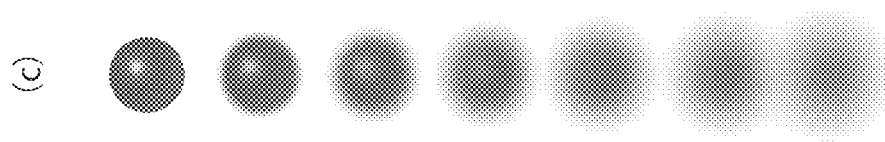
FIG. 5 includes diagrams for describing image data of virtual particles of the embodiment.
Figure 5:
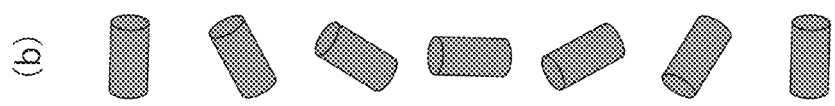
Figure 5:
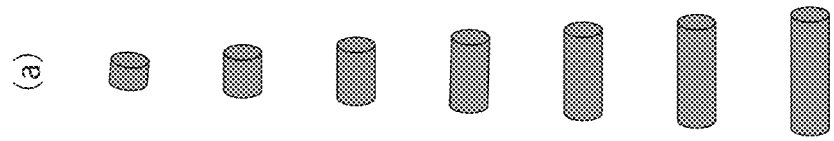

More specifically, as illustrated in FIG. 5(a), in a case where, for example, a model particle has a columnar shape and an aspect ratio is input within a predetermined numerical range as a particle parameter, the virtual particle generation unit 13 generates virtual particle image data of virtual particles obtained by changing the shape of the model particle so as to have various aspect ratios, and the label generation unit 14 generates label data by using the aspect ratios corresponding to these respective pieces of virtual particle image data.

As another example, as illustrated in FIG. 5(b), in a case where various orientations (rotation angles) of a particle are input as a particle parameter, the virtual particle generation unit 13 generates virtual particle image data of virtual particles obtained by rotating a model particle using the respective orientations, and the label generation unit 14 generates label data using the orientations (rotation angles) corresponding to these respective pieces of virtual particle image data.

Moreover, in a case where the degree of blur is input within, for example, a predetermined numerical range, as illustrated in FIG. 5(c), the virtual particle generation unit 13 generates virtual particle image data of virtual particles obtained by changing the degree of blur of a model particle in stages in the input numerical range, and the label generation unit 14 generates label data using the degrees of blur corresponding to these respective pieces of virtual particle image data.

The above-described example is a case where the virtual particle generation unit 13 generates virtual particles by changing one of various parameters indicating the form of the model particle; however, the virtual particle generation unit 13 may generate virtual particles by changing a plurality of parameters (for example, an aspect ratio and a degree of blur) of the model particle within predetermined numerical ranges.

Other examples of the label data include a result obtained by comparing one or more parameter values selected from the virtual particle generation condition with a preset reference value. Such label data may be, for example, a result of analysis desired by the user regarding virtual particles.

More specifically, for example, in a case where the user desires results of analysis indicating "particles having a predetermined aspect ratio (for example, 0.85) or higher, a predetermined particle diameter (for example, 8 μm) or larger, and a predetermined degree of blur or less correspond to passed, and other particles correspond to failed", results of comparison obtained by comparing the aspect ratio, the particle diameter, and the degree of blur, which are selected parameters, with predetermined respective reference values, that is, information indicating "passed" or "failed" is treated as label data.

The virtual particle image data and label data generated in this manner are associated with each other by the association unit 15. The association unit 15 in this case is configured to tag virtual particle image data of a virtual particle with label data generated for the virtual particle and store the resulting data in the virtual particle storage unit 16 formed in a predetermined area of the memory. Note that, as another embodiment, the generated virtual particle image data and the label data are separately stored in the virtual particle storage unit 16, and the association unit 15 may associate the virtual particle image data with the label data by using, for example, a table indicating a correspondence between the label data and the virtual particle image data. Note that the virtual particle storage unit 16 may be set in an external memory such as the cloud.

The machine learning unit 17 corresponds to a function executed by the artificial intelligence of the device 100 for generating data for particle analysis, and is configured to perform machine learning such as for example deep learning using input training data. Specifically, this machine learning unit 17 receives the virtual particle image data and label data associated with each other by the association unit 15, and is configured to perform supervised learning using, as training data, a pair of the virtual particle image data and the label data. Specifically, the machine learning unit 17 generates an analysis algorithm for performing image analysis on actual image data by learning the relationships of feature values calculated from the virtual image data to the label data. Note that actual image data associated with label data may further be input as training data to the machine learning unit 17.

By inputting many pieces of training data to the machine learning unit 17 and causing the machine learning unit 17 to perform machine learning, there are generated, for example, an analysis algorithm for analyzing, for example, the aspect ratio or particle diameter of a particle present in actual image data, an analysis algorithm for analyzing whether a particle present in actual image data satisfies a predetermined condition (whether passed or failed), or an analysis algorithm for analyzing whether a particle present in actual image data is a foreign object.

With the device 100 for generating data for particle analysis configured in this manner, virtual particle image data is generated from model particle information on model particles present in actual images, and thus a small amount of actual image data is sufficient to prepare vast amounts of training data and man-hours taken to, for example, prepare vast amounts of actual image data can be reduced as much as possible.

A result of analysis desired by the user regarding a virtual particle, such as an analysis result obtained in a case where a virtual particle is analyzed by the imaging particle analyzer X described above, is associated, as an evaluation, with the virtual particle image data, and machine learning is performed using the generated pair of the virtual particle image data and label data as training data. Thus, an analysis algorithm that meets user demands can be generated.

Virtual particle information is generated using various input parameters or various device conditions input by the operator, and thus various types of virtual particle image data or label data can be generated from a small amount of model particle information, and by extension vast amounts of training data can be generated.

Note that the present invention is not limited to the embodiment described above.

For example, the virtual particle generation unit 13 according to the embodiment described above is configured to generate image data of a single virtual particle as virtual particle image data; however, the virtual particle generation unit 13 may be configured to generate image data of a group of virtual particles constituted by a plurality of virtual particles as virtual particle image data.

Specifically, the generation condition acceptance unit 12 accepts, for example, a result of analysis desired by the user regarding a group of virtual particles or information regarding this analysis result as a virtual particle generation condition, and it is sufficient that the virtual particle generation unit 13 generate virtual particle image data such that the result of analysis desired by the user is obtained in a case where a group of virtual particles present in the virtual particle image data is analyzed by the imaging particle analyzer X described above.

Examples of the virtual particle generation condition include a condition as to whether a group of virtual particles present in virtual particle image data satisfies a predetermined standard. Specifically, if a result of analysis desired by the user indicates that "passed in a case where the proportion of aggregated particles in the entirety of a group of particles is less than a predetermined proportion, and failed otherwise", for example, a predetermined proportion of aggregated particles serving as a passed-failed standard may be an example of a virtual image generation condition.

Figure 6:
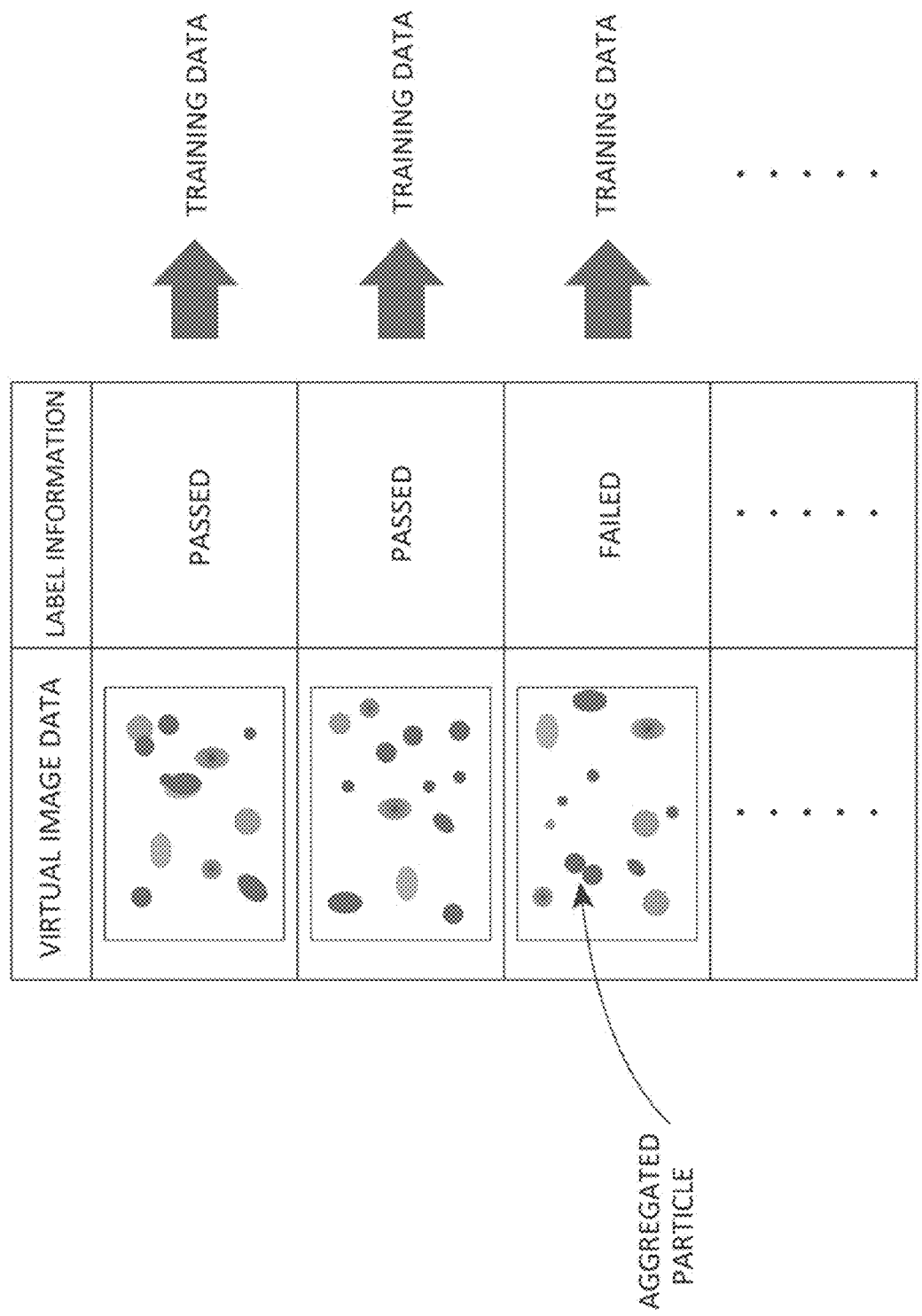
FIG. 6 is a diagram for describing training data used in machine learning in the embodiment.

In this case, the virtual particle generation unit 13 generates virtual particle image data of various aggregated particles or virtual particle image data of various single particles in advance and stores the data in the virtual particle storage unit 16. The virtual particle generation unit 13 generates virtual particle image data of a group of virtual particles obtained in a case where the proportion of aggregated particles is variously changed by performing image processing such as combining on these pieces of virtual particle image data as illustrated in FIG. 6. Note that the virtual particles illustrated in FIG. 6 include particles obtained by changing, for example, the shape, size, and degree of blur of a model particle.

Similarly to as in the embodiment described above, the label generation unit 14 generates label data, which is associated with the virtual particle image data generated by the virtual particle generation unit 13.

The label data in this case is, for example, information indicating a result of analysis desired by the user regarding the group of virtual particles. In this case, the label data is information indicating an analysis result obtained in a case where the group of virtual particles is analyzed by the imaging particle analyzer X described above, that is, information indicating "passed" or "failed". Note that, for example, a numerical value indicating the proportion of aggregated particles may be used as the label data.

With this configuration, by inputting pairs of the virtual particle image data and label data of groups of virtual particles to the machine learning unit 17 and causing the machine learning unit 17 to perform machine learning, there can be generated, for example, an analysis algorithm for analyzing whether a group of particles present in an actual image satisfies a predetermined condition (whether passed or failed) or an analysis algorithm for analyzing a particle diameter distribution of a group of particles present in actual image data.

Figure 7:
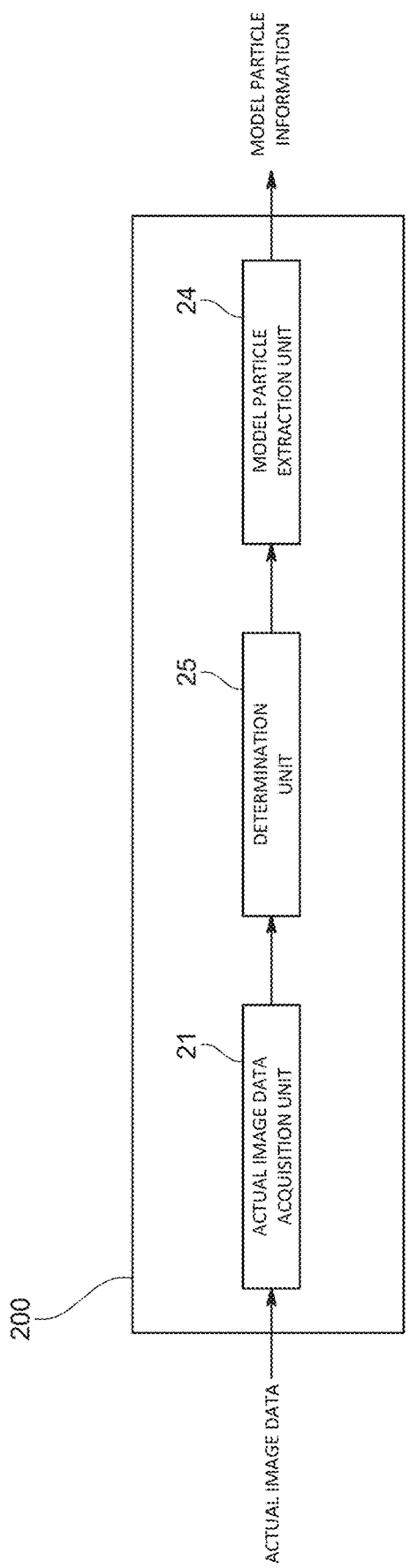
FIG. 7 is a functional block diagram for describing functions of an information processing device according to another embodiment.

In the embodiment described above, the case has been described where the operator, such as an engineer, extracts model particles while checking an actual image; however, as illustrated in FIG. 7, the information processing device 200 may have a function as a determination unit 25, which determines a particle to be extracted as a model particle from among a group of particles present in an actual image. An example of the determination unit 25 may be a determination unit that determines, among a group of particles, one or more particles that can be model particles by comparing predetermined parameters such as the lightness or luminance, the shape, and the size of particles present in an actual image with preset thresholds.

With this configuration, extraction of model particles or model particle information can be automated, thereby further reducing man-hours taken to generate analysis algorithms.

The model particle information may be not only information extracted from an actual image but also information generated by the operator, such as an engineer. In this case, it is sufficient that the model particle acquisition unit 11 acquire model particle information input by the operator to the device 100 for generating data for particle analysis.

Results of analysis desired by the user are not limited to those described in the embodiment described above, and may indicate, for example, "the proportion of particles larger or smaller than a predetermined particle diameter and included in a group of particles", "the aspect ratio of a rectangular particle", "whether an image of a particle or an image of a foreign object", and "a particle diameter distribution of a group of particles". It is sufficient that the device 100 for generating data for particle analysis be configured to be capable of receiving, as appropriate, a generation condition in accordance with individual demands.

As the generation condition, an analysis result (measurement result) obtained from an analyzer different from the imaging particle analyzer X may be used, the analyzer being, for example, a particle diameter distribution measurement device that calculates a particle diameter distribution on the basis of Mie scattering theory or dynamic scattering theory. Specifically, for example, the virtual particle generation unit 13 may be configured to generate, by receiving particle diameter distribution data obtained by a particle diameter distribution measurement device as a generation condition, virtual particle image data of a group of virtual particles having a particle diameter distribution indicated by the received particle diameter distribution data.

Furthermore, the virtual particle generation unit 13 may also be configured to generate virtual particle image data of a group of virtual particles including an image including streaked images of particles caused in a case where a group of particles present in an actual image has moved due to stirring or the Brownian movement.

In addition, the label generation unit 14 does not always have to generate label data on the basis of a virtual particle generation condition, and may generate label data on the basis of, for example, information input separately from the virtual particle generation condition by the operator, such as an engineer.

Figure 8:
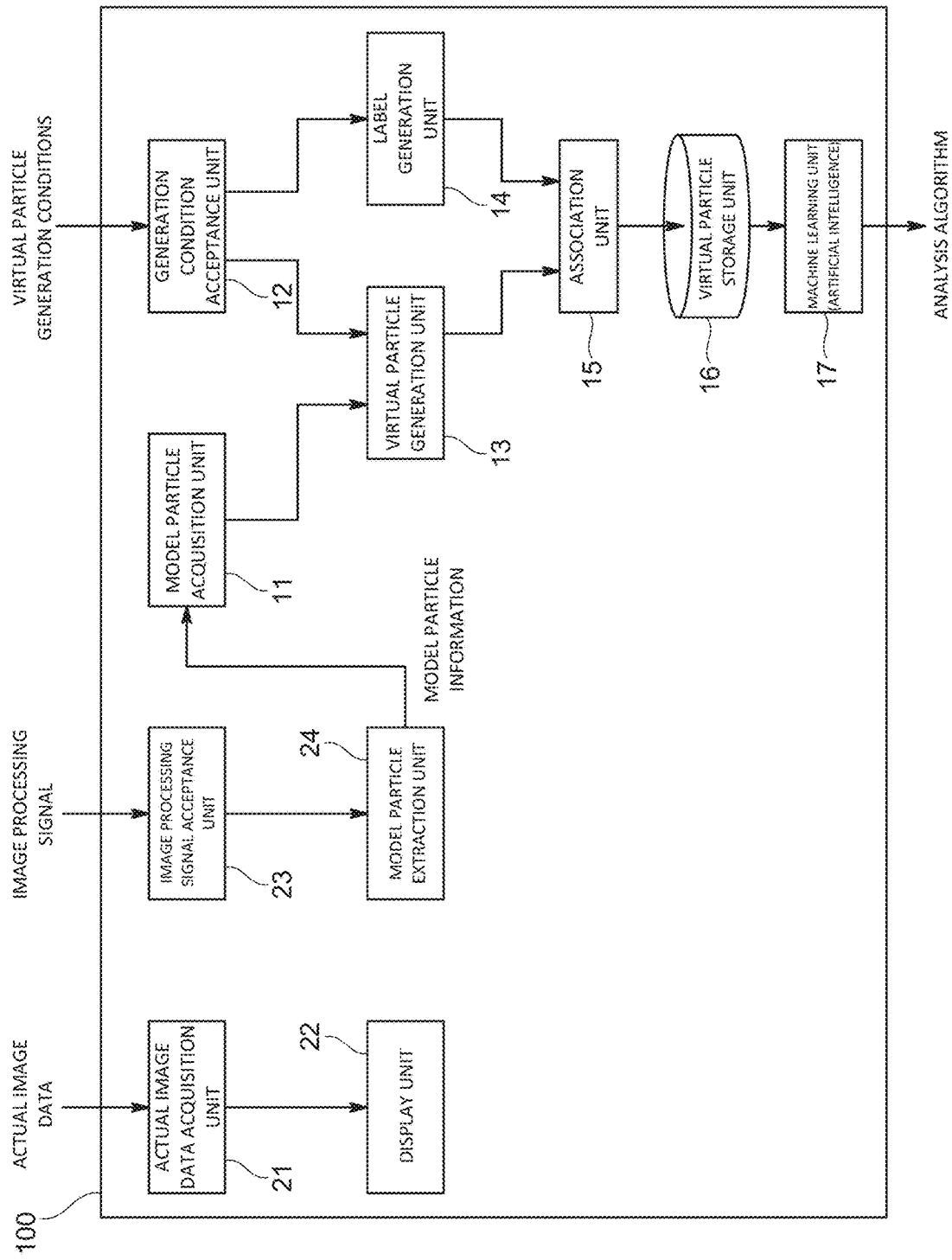
FIG. 8 is a functional block diagram for describing functions of a device for generating data for particle analysis according to another embodiment.

The device 100 for generating data for particle analysis may have some or all of the functions of the information processing device 200 as illustrated in FIG. 8.

Figure 9:
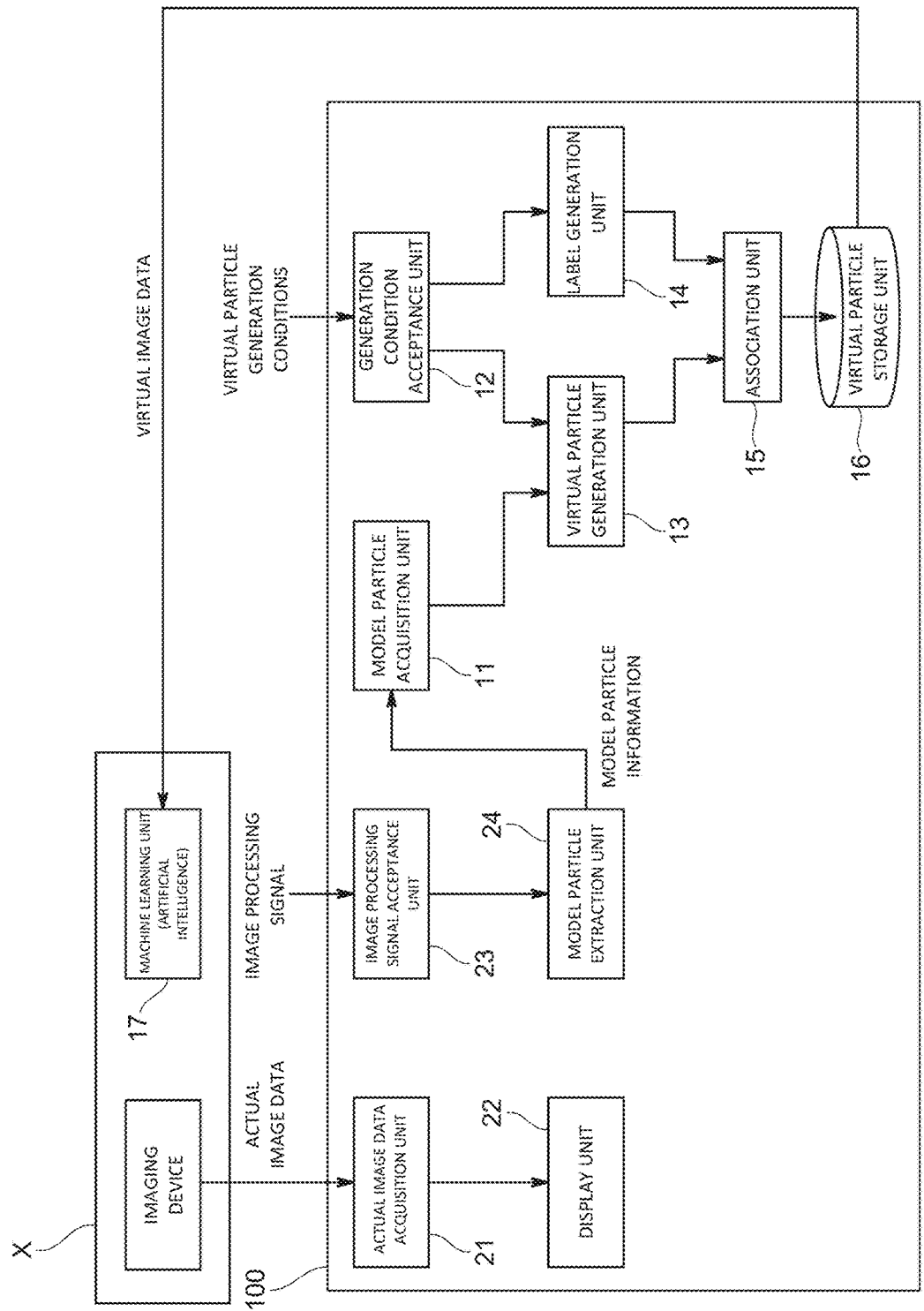
FIG. 9 is a functional block diagram for describing functions of an image particle analyzer according to another embodiment.

Furthermore, the imaging particle analyzer X may have some or all of the functions of the information processing device 200 or the device 100 for generating data for particle analysis in the embodiment described above. Specifically, as illustrated in FIG. 9, the imaging particle analyzer X may have artificial intelligence and a function as the machine learning unit 17, which is executed by the artificial intelligence, and the virtual image data generated by the device 100 for generating data for particle analysis may be input to the machine learning unit 17. In this case, the device 100 for generating data for particle analysis generates virtual image data without generating an analysis algorithm.

Furthermore, the virtual particle generation unit 13 may generate virtual particle image data by not using model particle information on model particles but using the generation condition accepted by the generation condition acceptance unit 12.

The device 100 for generating data for particle analysis may be configured to store, in the cloud or the like, a plurality of analysis algorithms generated through machine learning and to automatically select, for the user, an analysis algorithm to be used to analyze data of an actual image captured by the imaging particle analyzer X. To select an analysis algorithm, a search for a past virtual image generation condition is performed that is the same as or similar to the current virtual image generation condition, the past virtual image generation condition is extracted, and the analysis algorithm corresponding to the past virtual image generation condition can be selected.

In addition, various types of deformation of or various types of combination regarding the embodiment may be performed without departing from the gist of the present invention.

REFERENCE SIGNS LIST

X imaging particle analyzer
100 device for generating data for particle analysis
200 information processing device
11 model particle acquisition unit
12 generation condition acceptance unit
13 virtual particle generation unit
14 label generation unit
15 association unit
16 virtual particle storage unit
17 machine learning unit
21 actual image data acquisition unit
22 display unit
23 image processing signal acceptance unit
24 model particle extraction unit

INDUSTRIAL APPLICABILITY

According to the present invention, in relation to application of artificial intelligence to image analysis of particles, for example, man-hours taken to for example prepare vast amounts of actual image data obtained by actually capturing images of particles can be reduced as much as possible.

The invention claimed is:

1. A method for generating data for particle analysis, which is a method that generates data for particle analysis and uses the generated data in image analysis of a particle, the method comprising:
   a virtual particle generation step of generating virtual particle image data, which is image data of a virtual particle, on a basis of a predetermined condition;
   a label generation step of generating label data corresponding to the virtual particle; and
   an association step of associating the virtual particle image data with the label data and forming a pair of the virtual particle image data and the label data associated with the virtual particle image data that is usable as training data;
   a machine learning step of performing machine learning using the training data and generating a result; and
   a particle analysis step of using the result of the machine learning to analyze data of an actual image captured in an imaging particle analyzer,
   wherein, in the virtual particle generation step, the virtual particle image data is generated on a basis of a probability of another particle adhering to one particle or the number of other particles that can be adhered to one particle.

2. The method for generating data for particle analysis according to claim 1, wherein the machine learning step performs the machine learning using a plurality of pairs of the virtual particle image data and the label data associated with the virtual particle image data.

3. The method for generating data for particle analysis according to claim 1, wherein the predetermined condition includes at least one out of a particle parameter representing an exterior of a particle and an optical parameter based on an image capturing condition for an image of a particle.

4. The method for generating data for particle analysis according to claim 3, wherein the predetermined condition includes a range of values of the particle parameter or that of the optical parameter, and
   in the virtual particle generation step, a plurality of pieces of the virtual particle image data are generated on a basis of a plurality of values included in the range.

5. The method for generating data for particle analysis according to claim 3, wherein content of the label data is one or more parameter values selected from the predetermined condition or a result obtained by comparing the selected one or more parameter values with a reference value.

6. The method for generating data for particle analysis according to claim 3, wherein the virtual particle image data includes a plurality of particles for which values of the particle parameter or values of the optical parameter are different from each other.

7. The method for generating data for particle analysis according to claim 1, further comprising: a model particle acquisition step of acquiring information on a model particle, which is a model for the virtual particle,
wherein, in the virtual particle generation step, the virtual particle image data is generated using the information on the model particle.

8. A non-transitory computer program for generating data for particle analysis, which is a program that generates data for particle analysis to be used in image analysis of a particle, the program causing a computer to execute functions as:
a virtual particle generation unit that generates virtual particle image data, which is image data of a virtual particle, on a basis of a predetermined condition;
a label generation unit that generates label data corresponding to the virtual particle; and
an association unit that associates the virtual particle image data with the label data and forms a pair of the virtual particle image data and the label data associated with the virtual particle image data that is usable as training data for performing machine learning; and
a machine learning unit that performs machine learning using the training data and generates a result that is usable by an imaging particle analyzer to analyze data of an actual image captured in the imaging particle analyzer,
wherein the virtual particle generation unit generates the virtual particle image data on a basis of a probability of another particle adhering to one particle or the number of other particles that can be adhered to one particle.

9. The non-transitory computer program for generating data for particle analysis according to claim 8, wherein the machine learning unit performs the machine learning using a plurality of pairs of the virtual particle image data and the label data associated with the virtual particle image data.

10. The non-transitory computer program for generating data for particle analysis according to claim 8, wherein the predetermined condition includes at least one out of a particle parameter representing an exterior of a particle and an optical parameter based on an image capturing condition for an image of a particle.

11. The non-transitory computer program for generating data for particle analysis according to claim 10, wherein the predetermined condition includes a range of values of the particle parameter or that of the optical parameter, and
in the virtual particle generation unit, a plurality of pieces of the virtual particle image data are generated on a basis of a plurality of values included in the range.

12. The non-transitory computer program for generating data for particle analysis according to claim 10, wherein content of the label data is one or more parameter values selected from the predetermined condition or a result obtained by comparing the selected one or more parameter values with a reference value.

13. The non-transitory computer program for generating data for particle analysis according to claim 10, wherein the virtual particle image data includes a plurality of particles for which values of the particle parameter or values of the optical parameter are different from each other.

14. The non-transitory computer program for generating data for particle analysis according to claim 8, further comprising: a model particle acquisition step of acquiring information on a model particle, which is a model for the virtual particle,
wherein, in the virtual particle generation unit, the virtual particle image data is generated using the information on the model particle.

15. A device for generating data for particle analysis in combination with an imaging particle analyzer, the device generating data for particle analysis to be used by the imaging particle analyzer in image analysis of a particle, the device comprising:
a virtual particle generation unit that generates virtual particle image data, which is image data of a virtual particle, on a basis of a predetermined condition;
a label generation unit that generates label data corresponding to the virtual particle; and
an association unit that associates the virtual particle image data with the label data and forms a pair of the virtual particle image data and the label data associated with the virtual particle image data that is usable as training data for performing machine learning; and
a machine learning unit that performs machine learning using the training data and generates a result,
wherein the imaging particle analyzer uses the result of the machine learning to analyze data of an actual image captured in the imaging particle analyzer, and
wherein, in the virtual particle generation step unit, the virtual particle image data is generated on a basis of a probability of another particle adhering to one particle or the number of other particles that can be adhered to one particle.

* * * * *